(12) United States Patent  
Tokano

(10) Patent No.: US 7,510,796 B2  
(45) Date of Patent: Mar. 31, 2009

(54) ELECTRONIC EQUIPMENT HAVING A BATTERY RECEIVING CHAMBER AND BATTERY LID WITH A MOVABLE CONTACT TERMINAL

(75) Inventor: Kaneyoshi Tokano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 10/999,676

(22) Filed: Nov. 30, 2004

(65) Prior Publication Data

US 2005/0134216 A1    Jun. 23, 2005

(30) Foreign Application Priority Data

Dec. 3, 2003    (JP) .............................. 2003-404558

(51) Int. Cl.  
*H01M 2/10* (2006.01)  
*G03B 17/00* (2006.01)

(52) U.S. Cl. .............................. 429/96; 429/97; 429/98; 429/99; 429/100; 396/539

(58) Field of Classification Search ................. 396/539, 396/277; 220/843, 844; 429/175, 178, 179; 29/747; 439/387–444, 754–864  
See application file for complete search history.

(56) References Cited

U.S. PATENT DOCUMENTS 3,682,060 A * 8/1972 Furuta ......................... 396/539

5,456,621 A * 10/1995 Gan ............................. 439/700  
5,567,545 A * 10/1996 Murakami ................... 429/163  
2002/0186978 A1 * 12/2002 Tanaka et al. ............... 396/539

FOREIGN PATENT DOCUMENTS

JP    07-045263    2/1995  
JP    2003-178733    6/2003

* cited by examiner

*Primary Examiner*—Dah-Wei D Yuan  
*Assistant Examiner*—Katherine Turner  
(74) *Attorney, Agent, or Firm*—Cowan, Liebowitz & Latman, P.C.

(57) ABSTRACT

An electronic equipment, comprising: a battery receiving chamber for receiving a battery, a battery lid arranged to be rotatable to open and close an opening portion of the battery receiving chamber, a locking member arranged to engage with the battery receiving chamber to lock the battery lid so that the opening portion of the battery receiving chamber is closed, a contact terminal connectable to a terminal of the battery received in the battery receiving chamber, the contact terminal being arranged to be build in the battery lid movably in a thickness direction of the battery lid, wherein the contact terminal is arranged to protrude into the inside of the battery lid in accordance with the locking member engaging with the battery receiving chamber with the battery lid is closed and the contact terminal is retracted into the battery lid in accordance with the locking member being released from engagement with the battery receiving chamber.

4 Claims, 7 Drawing Sheets

ELECTRONIC EQUIPMENT HAVING A BATTERY RECEIVING CHAMBER AND BATTERY LID WITH A MOVABLE CONTACT TERMINAL

BACKGROUND OF THE INVENTION

1. Field of the Invention

The present invention relates to a battery receiving device receiving a battery and an imaging device using the battery receiving device.

2. Related Background Art

A double A battery, for example, constituting a power source of the device main body is cylindrical, has a plus terminal portion 11 at a top portion and a minus terminal portion 12 in a bottom portion, and supplies a power to the device main body (FIG. 6).

FIG. 6 is a cross sectional view showing a schematic structure of a conventional battery receiving chamber, and shows a battery lid in a closed locked state.

In FIG. 6, the device main body (not shown) has a battery receiving chamber 2 for receiving a battery 1, and the battery receiving chamber 2 has a battery lid 3 at its top portion for opening and closing an opening portion of the battery receiving chamber 2 through a hinge pin 7.

The battery lid 3 has a cavity in its inside, and has a built-in plus contact terminal 4 in its cavity. The plus contact terminal 4 has, at its lower end, a plus contact portion 41 which contacts the plus terminal portion 11 of the battery 1.

The battery receiving chamber 2 has, at its bottom portion, an internal contact terminal 5 comprising an U-shaped spring engaged to the top portion side and the internal contact terminal 5 has a minus contact portion 51 to contact the minus terminal 12 of the battery 1 on its top end.

The battery receiving chamber 2, when the battery lid 3 is in an open state, is capable of being loaded with and unloaded from the battery 1, and when the lid is in a closed state, is capable of supplying a power to the device main body.

The battery receiving chamber 2 has a lock engaging concave portion 21 directly under the inside portion of the battery lid 3, and the battery lid 3 has a built-in lock member 6, and this lock member 6 can move forward and backward in a longitudinal direction of the battery lid 3 for the lock engaging concave portion 21 in a closed state of the battery lid 3. The lock member 6 is in the shape of a L-character to constitute an operating portion 61 whose one end is engaged with the lock engaging concave portion 21 while the other end is sticking out from the battery lid 3.

In FIG. 6, the battery lid 3 is closed and at the same time, it is in a locked state by the engagement of the lock member 6 with the lock engaging concave portion 21 (closed locked state), and the plus contact terminal 4 and a minus contact terminal 5 abut against the plus terminal portion 11 and the minus terminal portion 12, respectively. Hence, when a circuit inside the device main body is closed, the power can be supplied to the device main body.

In FIG. 6, when the operating portion 61 of the lock member 6 is operated in a direction of an arrow mark C (direction reverse to a lock direction), as shown in FIG. 7, the battery lid 3 swings to a direction of an arrow mark D (open lock release state), and eventually as shown in FIG. 8, the opening portion of the battery receiving chamber 2 can be made fully open (into an open state). In this state, the user can load and unload the battery 1.

The plus contact portion 41 of the plus contact terminal 4 is "flat" in the shape of its top end portion, and the top end portion of the minus contact portion 51 of the minus contact terminal 5 has a "convexo-concave shape having the triangle cross section".

The reason why the shape of the top end portion of the minus contact portion 51 is made into the "convexo-concave shape having the triangle cross section" is that, depending on the maintenance state of the battery 1, a foreign matter and an oxide film adhered and formed in the plus terminal 11 and the like are required to be scraped away to decrease a contact resistance value, thereby increasing the operating time of the battery 1.

However, since the plus contact portion 41 of the plus contact terminal 4 is accessed every time the user exchanges the battery 1, the plus contact portion 41 is not of the "convexo-concave shape having the triangle cross section" but "flat" in the shape of its top end portion for safety sake of the user. Hence, it is difficult to favorably maintain a contact state between the plus contact portion 41 of the plus contact terminal 4 and the plus terminal portion 11 of the battery 1.

SUMMARY OF THE INVENTION

The object of the present invention is to provide an electronic equipment comprising a battery receiving chamber and battery lid capable of favorably maintaining a contact state between the contact portion of a contact terminal and the end portion of a battery, while maintaining safety of the user when the battery is exchanged.

To achieve the above described object, according to one aspect of the present invention, a battery receiving chamber provided in an electronic equipment to receive the battery, which also comprises a battery lid arranged to be rotatable to open and close an opening portion of the battery receiving chamber, a locking member arranged to engage with the battery receiving chamber to lock the battery lid so that the opening portion of the battery receiving chamber is closed, a contact terminal connectable to a terminal of the battery received in the battery receiving chamber, the contact terminal being arranged to be built in the battery lid movably in a thickness direction of the battery lid and wherein the contact terminal is arranged to protrude into the inside of the battery lid in accordance with the locking member engaging with the battery receiving chamber when the battery lid is closed and the contact terminal is retracted into the battery lid in accordance with the locking member being released from engagement with the receiving member.

According to the above described arrangement, when the battery lid is closed and the battery lid is locked, the contact portion protrudes into the inside of the battery lid, and when the lock is released, the contact portion is retracted into the battery lid, and therefore, the contact state between the contact portion of the contact terminal and the end portion of the battery can be favorably maintained, while maintaining safety of the user when the battery is exchanged.

DESCRIPTION OF THE PREFERRED EMBODIMENTS

Figure 1:
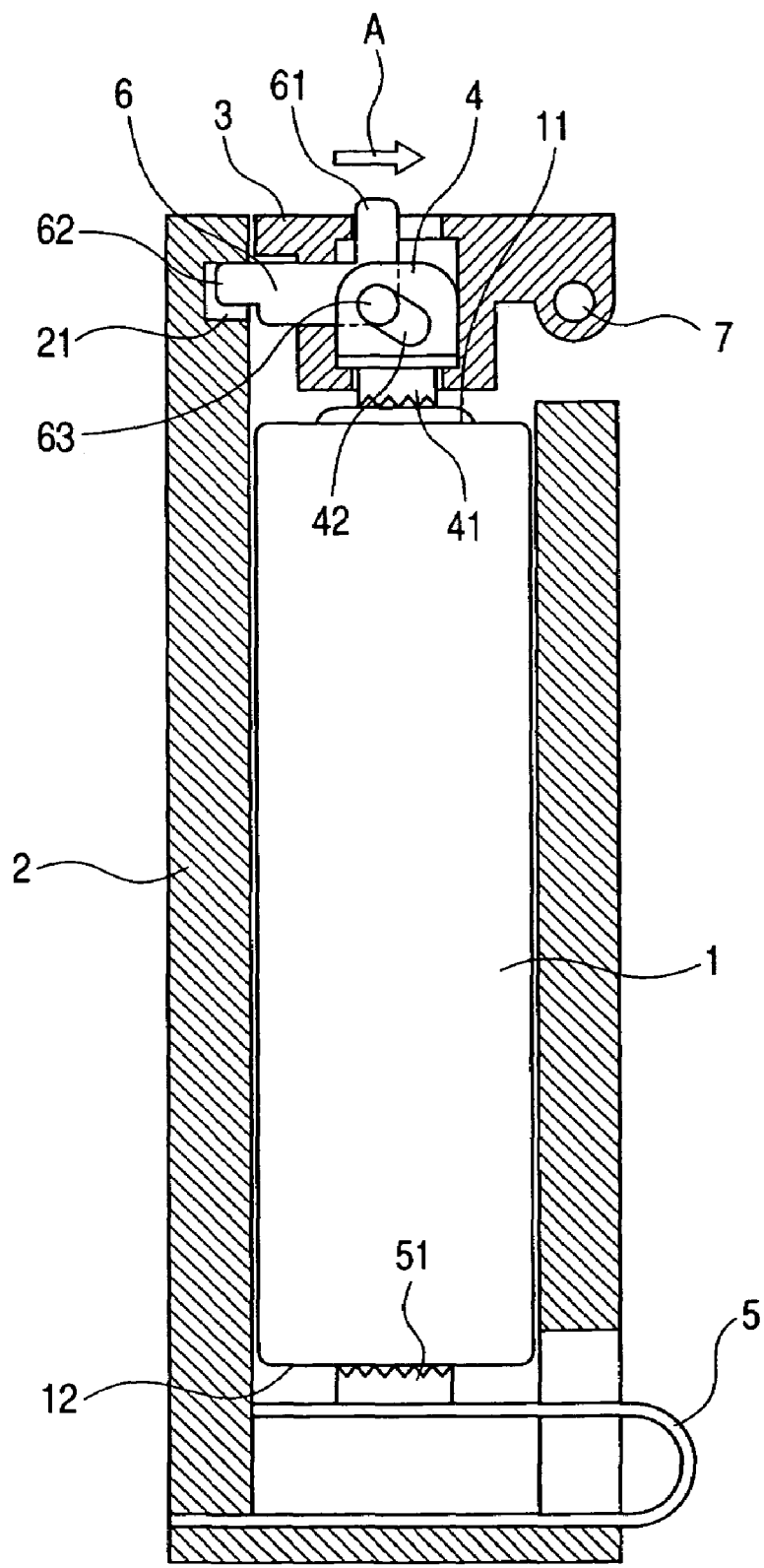
FIG. 1 is a cross sectional view showing a schematic structure of a battery receiving chamber comprising a battery lid according to an embodiment of the present invention, which is in the case where the battery lid is in a closed locked state.

A double A battery, for example, constituting a power source of the device main body is cylindrical, and has a plus terminal portion 11 at a top portion and a minus terminal portion 12 at a bottom portion, and supplies a power to the device main body (FIG. 1).

FIG. 1 is a cross sectional view showing a schematic structure of a battery receiving chamber comprising a battery lid of the present invention, which is in the case where the battery lid is in a closed lock state.

In FIG. 1, the device main body (not shown) has a battery receiving chamber 2 for receiving a battery 1, and the battery receiving chamber 2 has a battery lid 3 at its top portion for opening and closing an opening portion of the battery receiving chamber 2 through a hinge pin 7.

The battery lid 3 has a cavity in its inside, and has a built-in plus contact terminal 4 in its cavity. The plus contact terminal 4 has, at its lower end, minus terminal portion 12 which contacts the plus terminal portion 11 of the battery 1. The plus contact terminal 4 arranged as to be movable in a thickness direction of the battery lid 3 in a cavity.

The battery receiving chamber 2 has, at its bottom portion, an internal contact terminal 5 comprising an U-shaped spring engaged to the top portion side, and the internal contact terminal 5 has a minus contact portion 51 to contact the minus terminal 12 of the battery 1 on its top end.

The battery receiving chamber 2, when the battery lid is in an open state, is capable of being loaded with and unloaded from the battery 1, and when the lid is in a closed state, is capable of supplying a power to the device main body.

The battery receiving chamber 2 has a lock engaging concave portion 21 directly under the inside portion of the battery lid 3, and the battery lid 3 has a built-in lock member 6, and this lock member 6 is protrudable and retractable in a longitudinal direction of the battery lid 3 for the lock engaging concave portion 21 in a closed state of the battery lid 3. The lock member 6 is in the shape of a L-character to constitute an operating portion 61 whose one end is engaged with the lock engaging concave portion 21 and the other end is sticking out from outside of the battery lid 3.

The lock member 6 has a cam pin 63 arranged in parallel (vertical to each of a longitudinal direction and a thickness direction of the battery lid 3) to a hinge pin 7 at a corner portion of the L-character shape, and the plus contact terminal 4 has a long hole 42 which engages with a cam pin 63. The long hole 42 is inclined to the hinge pin 7 side with respect to a thickness direction of the battery lid 3, and to be more specific, its inclination direction is provided so that, when the battery lid 3 is closed, the plus contact terminal 4 moves inside the battery lid 3 in case the lock member 6 is moved to the lock engaging concave portion 21 side (lock direction), and the plus contact terminal 4 moves to the outside of the battery lid 3 when the lock member 6 moves to the hinge pin 7 side (reverse to the lock direction).

The plus contact portion 41 of the above described contact terminal 4 and the minus contact portion 51 of the above described minus contact terminal 5 are of the "convexo-concave shape having the triangle cross section" at their top end portions, respectively.

In FIG. 1, the battery lid 3 is closed, and at the same time, the lock member 6 moves to a side of the lock engaging concave portion 21 and is in a locked state caused by the engagement of the lock portion 62 with the lock engaging concave portion 21 (closed locked state). At this time, the plus contact terminal 4 moves to the inside of the battery lid 3 and allows the plus contact terminal 4 and the minus contact terminal 5 to abut against the plus terminal portion 11 and the minus terminal portion 12, respectively. Hence, when the circuit inside the device main body is closed, a power can be supplied to the device main body.

Figure 2:
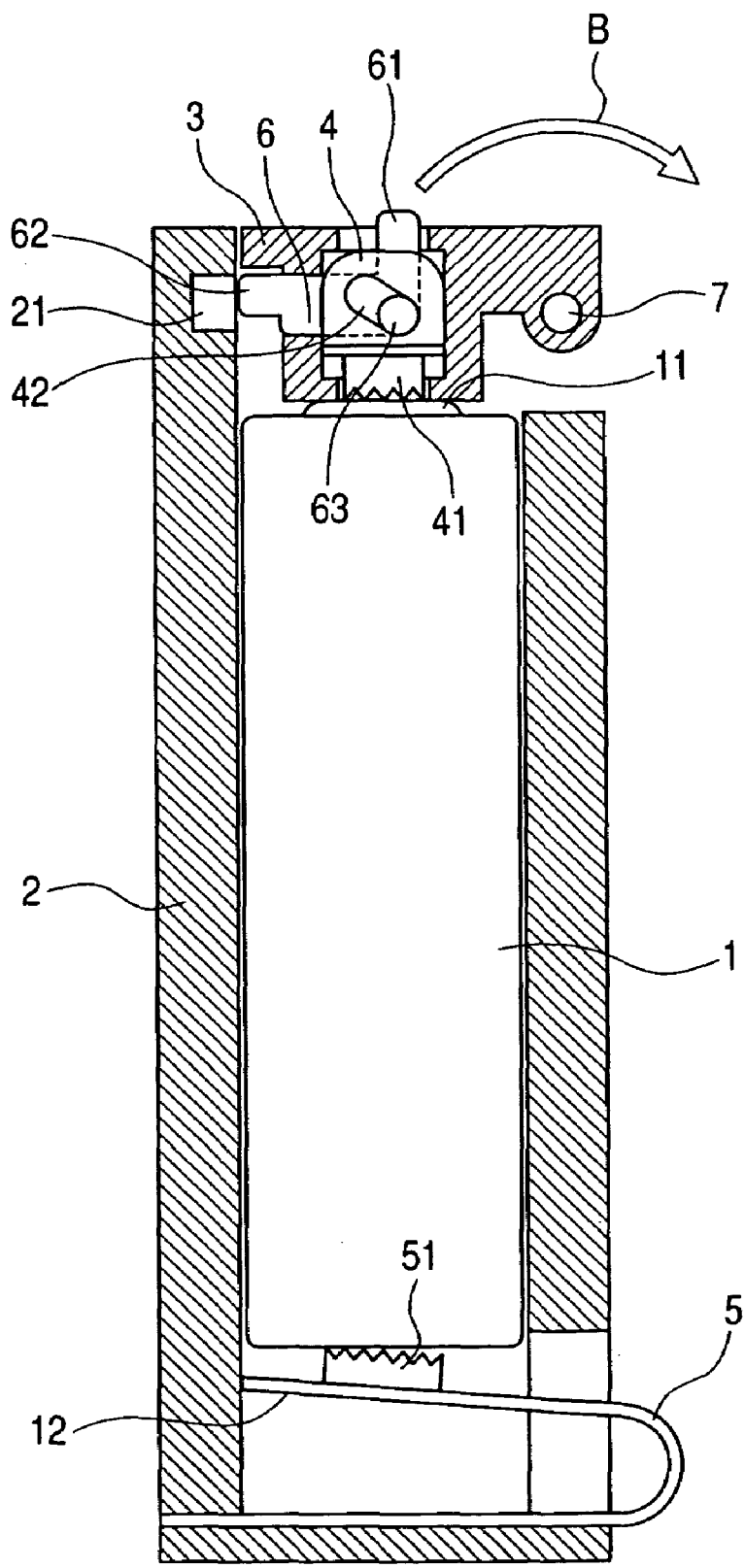
FIG. 2 is a cross sectional view showing a schematic structure of a battery receiving chamber comprising a battery lid according to an embodiment of the present invention, which is in the case where the battery lid is in an open lock released state.
Figure 3:
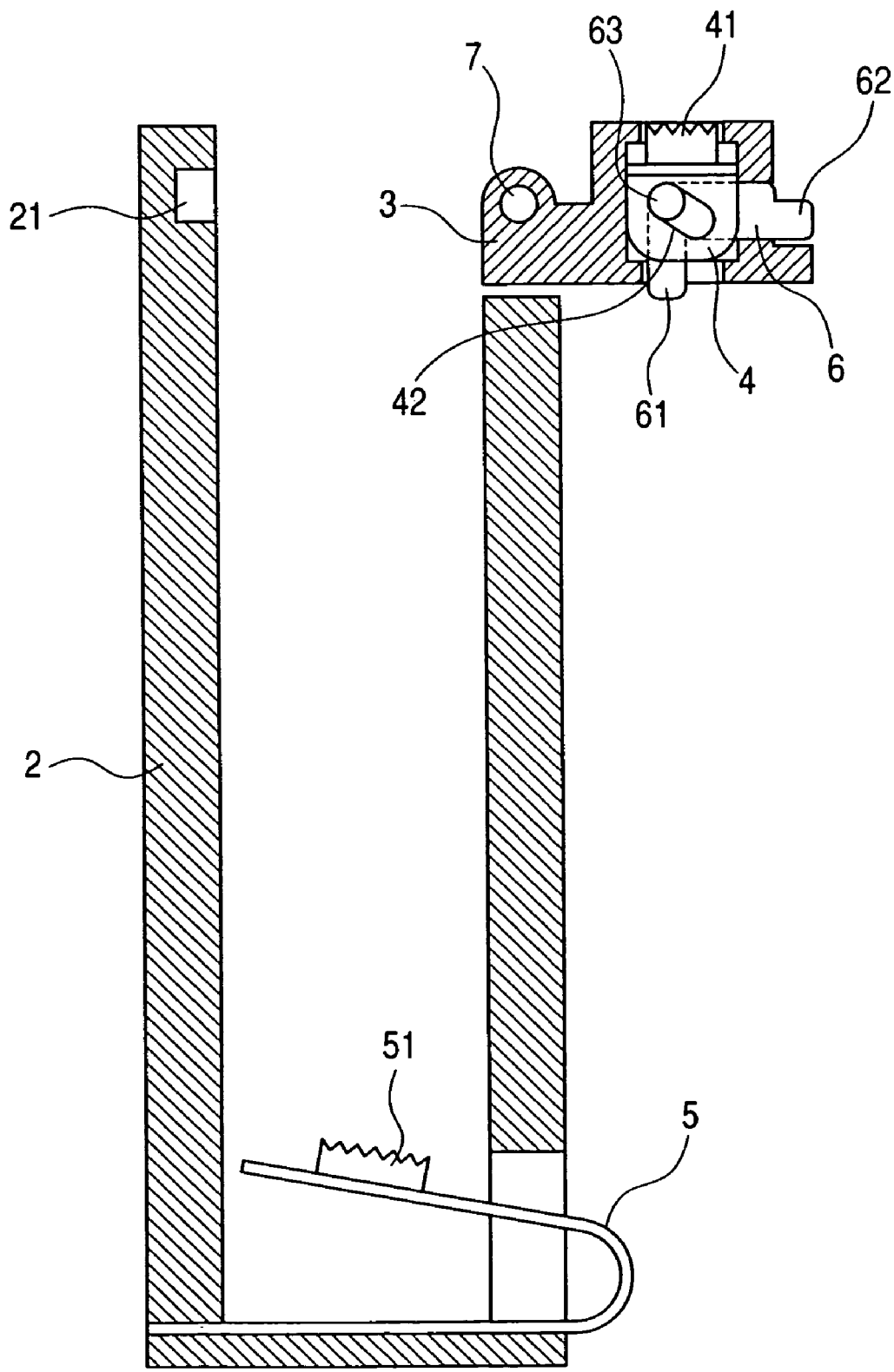
FIG. 3 is a cross sectional view showing a schematic structure of a battery receiving chamber comprising a battery lid according to an embodiment of the present invention, which is in the case where the battery lid is in an open state.

In FIG. 1, when the operating portion 61 of the lock member 6 is operated to a direction of an arrow mark A (hinge pin 7 side), as shown in FIG. 2, when the battery lid 3 swings to a direction of an arrow mark B, the plus contact terminal 4 is moved to the outside of the battery lid 3 by the operation of the cam pin 63 and the long hole 42 (open lock released state), and eventually as shown in FIG. 3, the opening portion of the battery receiving chamber 2 can be made fully open (into an open state). In this state, the user can load and unload the battery 1.

According to the present embodiment, by closing the battery lid 3 and moving the lock member 6 to the side of the lock engaging concave portion 21 (lock direction), the plus contact terminal 4 is moved to the inside of the battery lid 3, so that the plus contact terminal 4 having the "convexo-concave shape having the triangle cross section" at its top end portion can be allowed to surely abut against the plus terminal portion 11 (FIG. 1), and at the same time, when the battery lid 3 is opened, by moving the lock member 6 to the side of the hinge pin 7, the plus contact terminal 4 is moved to the outside of the battery lid 3, so that the plus contact terminal 4 having the "convexo-concave shape having the triangle cross section" at its top end portion can be surely received inside the cavity of the battery lid 3 (FIGS. 2 and 3), thereby making it possible to favorably maintaining the contact state between the plus contact portion 41 of the plus contact terminal 4 and the plus terminal portion 11 of the battery 1, while maintaining safety of the user when the battery is exchanged.

Figure 4:
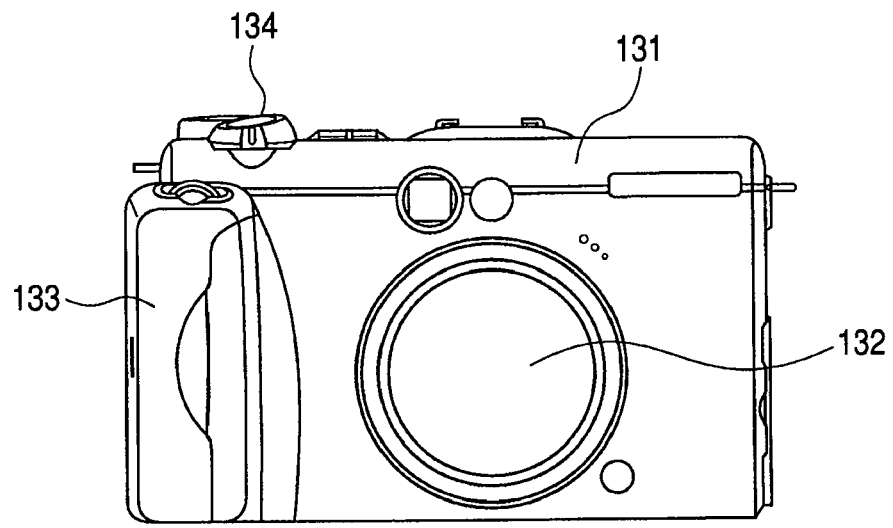
FIG. 4 shows an imaging device comprising the battery receiving chamber of FIGS. 1 to 3.
Figure 5:
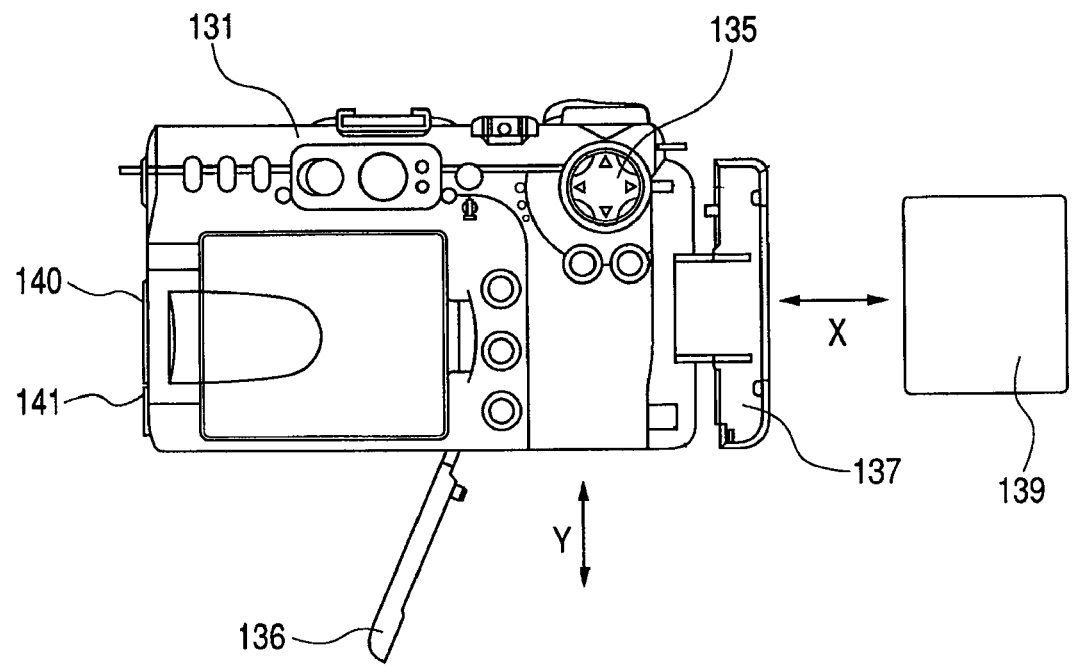
FIG. 5 shows an imaging device comprising the battery receiving chamber of FIGS. 1 to 3.
Figure 6:
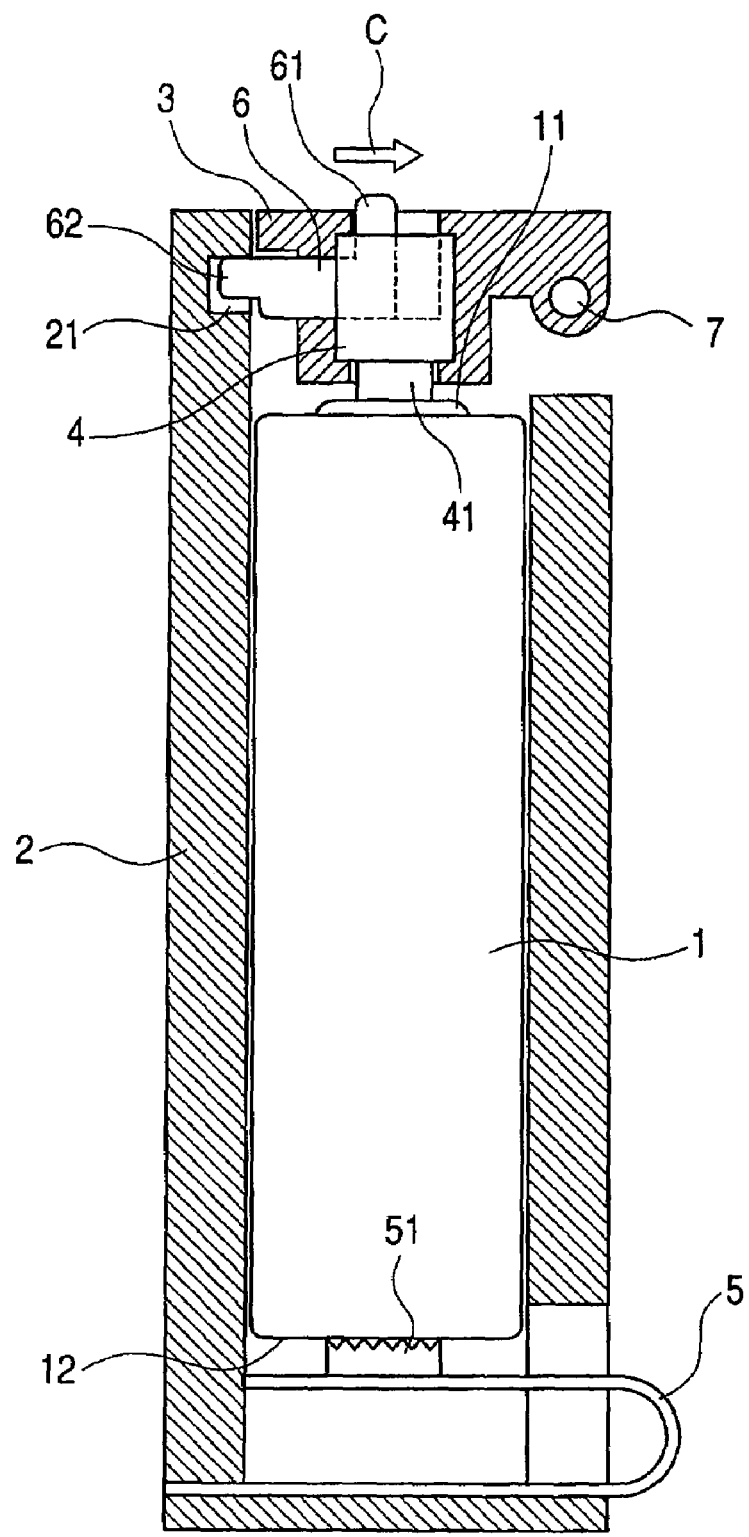
FIG. 6 is a cross sectional view showing a schematic structure of a conventional battery receiving chamber, which is in the case where the battery lid is in a closed locked state.
Figure 7:
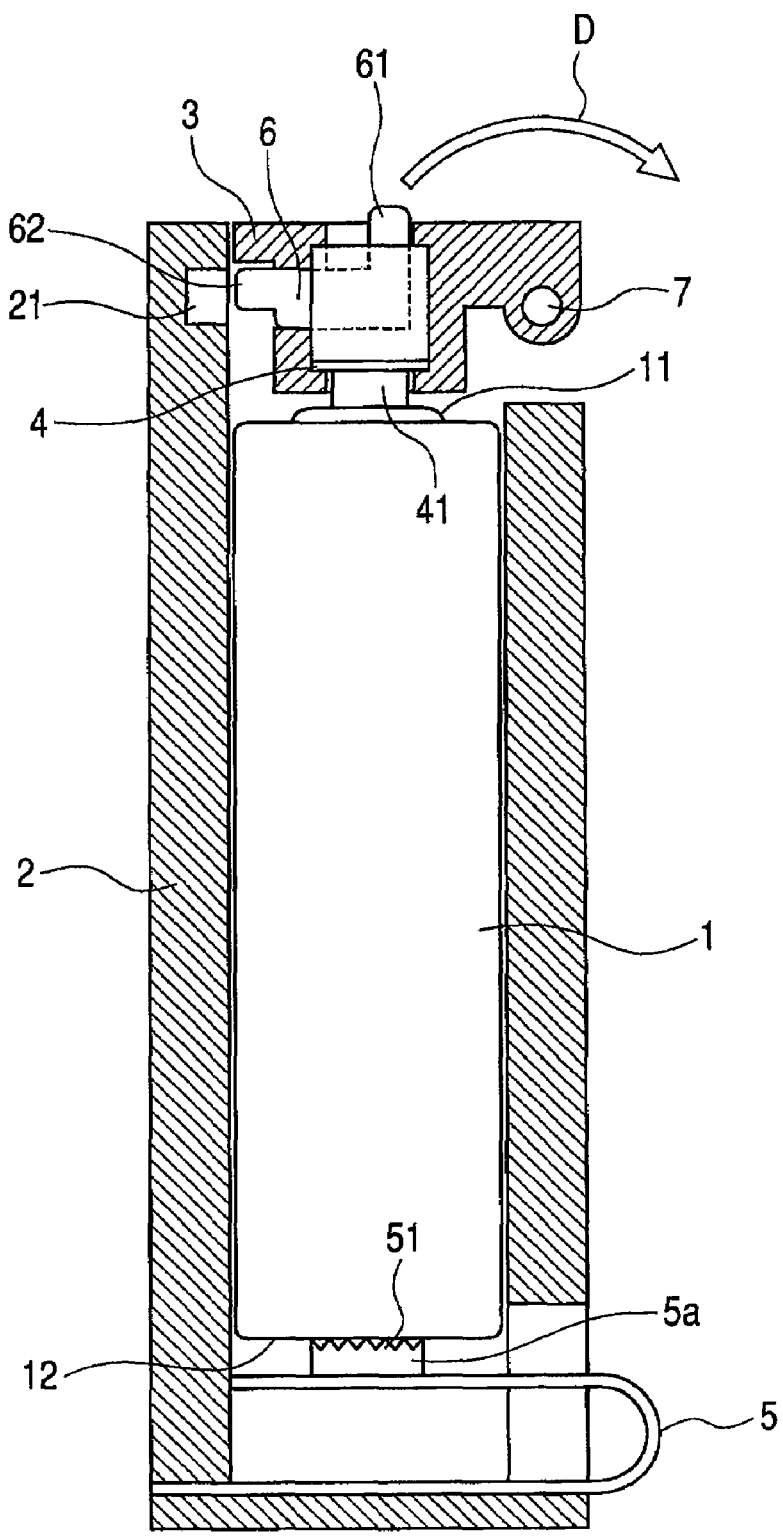
FIG. 7 is a cross sectional view showing a schematic structure of a conventional battery receiving chamber, which is in the case where the battery lid is in an open lock released state.
Figure 8:
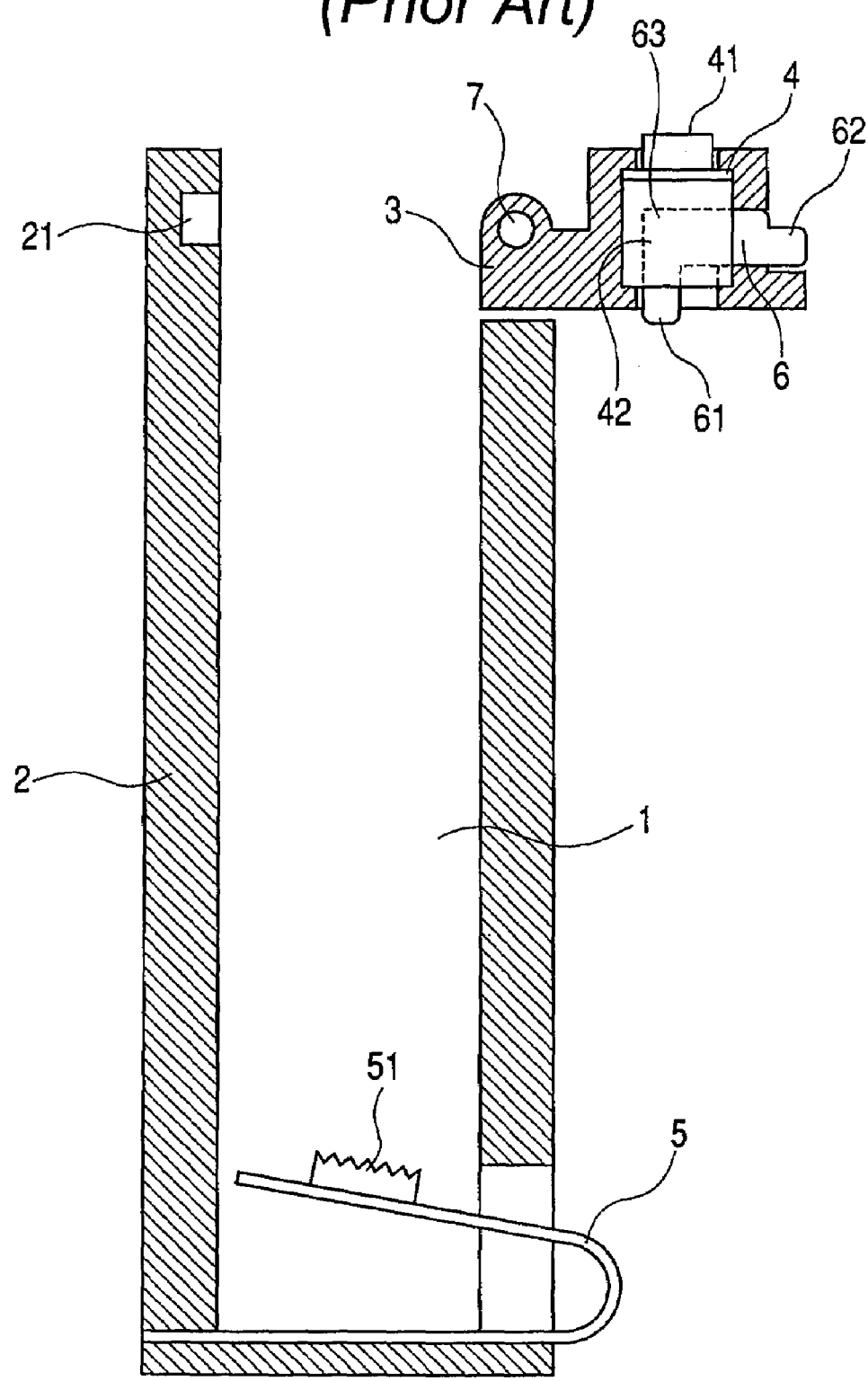
FIG. 8 is a cross sectional view showing a schematic structure of a conventional battery receiving chamber, which is in the case where the battery lid is in an open state.

In FIGS. 4 and 5 is shown a structure of an imaging device having the above described battery receiving chamber. In FIG. 4, at the left side of a lens barrel 132 seen from an imaging device front surface, there is provided a holding portion 133 easy to handle by a right hand, and on the upper surface, there is provided a shutter bottom 134 easy to operate by a right hand first finger. In FIG. 5, on the back face of the imaging device main body 131, there is provided an operating button 135, and on the left side surface, a speaker 140 and a terminal 141.

A battery lid 136 is swingably attached to the bottom surface of the imaging device main body 131, and a memory card lid 137 is swingably attached to the side surface 137 of the imaging device main body 131. When the battery lid 136 is swung, the opening portion of the battery receiving chamber for receiving the battery can be opened and closed, and the battery can be loaded and unloaded to the battery receiving chamber in a direction of arrow mark Y.

Further, when a memory card lid 137 is swung, the opening portion of the memory card storage chamber for receiving the memory card 139 (recording medium) can be opened and closed, and the memory card 139 can be loaded and unloaded to the memory card receiving chamber in the direction of the arrow mark X.

Many widely different embodiments of the present invention may be constructed without departing from the scope of the present invention. It should be understood that the present invention is not limited to the specific embodiments described in the specification, except as defined in the appended claims.

This application claims priority from Japanese Patent Application No. 2003-404558 filed Dec. 3, 2003, which is hereby incorporated by reference herein.

What is claimed is:

1. An electronic equipment, comprising:
   a) a battery receiving chamber for receiving a battery;
   b) a battery lid arranged to be rotatable to open and close an opening portion of the battery receiving chamber;
   c) a locking member arranged to engage with the battery receiving chamber to lock the battery lid so that the opening portion of the battery receiving chamber is closed;
   d) a contact terminal connectable to a terminal of the battery received in the battery receiving chamber, the contact terminal being arranged to be built in the battery lid movably in a thickness direction of the battery lid,
   wherein the contact terminal is arranged to protrude into the inside of the battery lid in accordance with the locking member engaging with the battery receiving chamber when the battery lid is closed, and the contact terminal is retracted into the battery lid in accordance with the locking member being released from engagement with the battery receiving chamber.

2. An electronic equipment according to claim 1, wherein the contact terminal has convexo-concave shape having the triangle cross section at their top end portion.

3. An electronic equipment according to claim 1, wherein the locking member is built in the battery lid so that the locking member is movable in a direction to an engagement with the battery receiving member in accordance with the battery lid being closed, and wherein the contact terminal is arranged to move in the thickness direction of the battery lid in accordance with the locking member moving in the direction to the engagement with the battery receiving member.

4. An electronic equipment according to claim 3, wherein the locking member includes a cam pin protrudes in a direction perpendicular to each of the direction to the engagement with the battery receiving chamber and the thickness direction of the battery lid, wherein the contact terminal engages with the cam pin and has a long hole which is formed with being sloped in the thickness direction of the battery lid so that the contact terminal moves to the inside of the battery receiving chamber in accordance with the locking member moving to the direction of the engagement with the battery receiving chamber when the battery lid is closed and moves to the outside of the battery receiving chamber in accordance with the locking member moving in a direction in which engagement between the locking member and the battery receiving chamber is released.

\* \* \* \* \*